Nov. 19, 1968          M. KANNER          3,412,305
DIRECT-CURRENT MOTOR SERVO SYSTEM HAVING A SUBSTANTIALLY
LINEAR VOLTAGE-SPEED CHARACTERISTIC
Filed Jan. 25, 1966
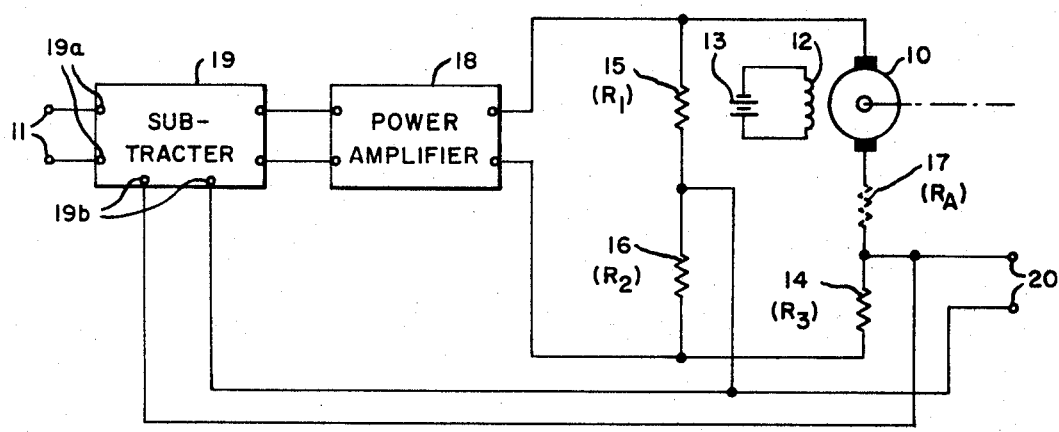

United States Patent Office 3,412,305
Patented Nov. 19, 1968

3,412,305
DIRECT-CURRENT MOTOR SERVO SYSTEM HAVING A SUBSTANTIALLY LINEAR VOLTAGE-SPEED CHARACTERISTIC
Martin Kanner, Plainview, N.Y., assignor to Fairchild Camera and Instrument Corporation, a corporation of Delaware
Filed Jan. 25, 1966, Ser. No. 522,990
3 Claims. (Cl. 318—331)

ABSTRACT OF THE DISCLOSURE

A direct-current motor servo system comprises a servo-signal input circuit, a first resistance element, and a power amplifier responsive to the signal at the input circuit for energizing the armature of a motor to be controlled in series with the first resistance element. The servo system further includes second and third serially connected resistance elements connected in parallel with the series-connected armature and first resistance element and in the same order. The ratio of the resistance of the first element to the armature resistance of the motor to be controlled is made substantially equal to the ratio of the resistance of the third element to that of the second element. The servo system further includes a subtracter circuit interposed between the input circuit and the power amplifier for differentially adding the voltage difference between the junctions of the elements of the two series circuits to the voltage of the input circuit to modify the response of the motor energizing circuit. An output circuit is connected between the junctions of the elements of the two series circuits to provide an output signal representative of the speed of the controlled motor.

---

This invention relates to a direct-current motor servo system and particularly to a closed-loop servo system for imparting to a direct-current motor a substantially linear voltage-speed characteristic.

In direct-current motor servo systems, it is frequently desired that the speed of the servo motor be varied linearly in accordance with an input or control potential. For more accurate and linear control, it is usually desirable to provide a closed-loop servo system utilizing a feed-back signal varying with the speed of the motor so that the system is substantially a null system. Such a feed-back signal is generally obtained from an auxiliary direct-current tachometer driven by the servo motor and developing a voltage varying linearly with speed. Such a speed-representative voltage is fed back and differentially combined with the servo input signal, the difference or error signal being amplified and utilized to energize the servo motor. As well known in the art, the use of such a negative feedback voltage representative of the speed of the motor serves to stabilize a position servo or to cause the speed of the motor of a velocity servo to vary substantially linearly with the input servo voltage.

Prior servo systems of the type described, while satisfactory in terms of performance, have involved the additional cost of a tachometer generator. Moreover, in applications in which available space is limited, such an additional tachometer increases the bulk of the servo system.

It is an object of the invention to provide a new and improved direct-current motor servo system which avoids the use of an auxiliary tachometer generator and is of correspondingly reduced cost and bulk.

In accordance with the invention, there is provided a direct-current motor servo system having a substantially linear voltage-speed characteristic comprising a servo-signal input circuit, a first resistance element, a power amplifier responsive to the signal at the input circuit for energizing the armature of a motor to be controlled in series with the first resistance element, second and third serially connected resistance elements connected in parallel with the series connected armature and first resistance element and in the same order, the ratio of the resistance of the first element to the armature resistance of the motor to be controlled being substantially equal to the ratio of the resistance of the third element to that of the second element, and means for differentially adding the voltage difference between the junctions of the elements of the two series circuits to the voltage of the input circuit to modify the response of the motor-energizing means.

For a better understanding of the present invention, together with other and further objects thereof, reference is had to the following description, taken in connection with the accompanying drawing, while its scope will be pointed out in the appended claims.

Referring now to the drawing:

The single figure is a circuit diagram of a direct-current motor servo system embodying the invention.

Referring now more particularly to the drawing, there is represented a servo system for a direct-current motor 10 having a substantially linear voltage-speed characteristic. The system includes a servo system input circuit 11 to which is applied a voltage representative of the desired speed of the motor 10. The motor 10 is provided with a conventional field winding 12 energized from a suitable source, such as a battery 13.

The servo system of the invention comprises a resistance element 14 and means responsive to the signal at the input circuit 11, specifically a power amplifier 18, for energizing the armature of the motor 10 in series with the resistance element 14. The servo system further comprises serially connected resistance elements 15 and 16 connected in parallel with the series connected motor armature and resistance element 14 and in the same order. For the reasons described hereinafter, the ratio of the resistance of the element 14 to the armature resistance of the motor 10, represented by the dotted line resistance element 17, is substantially equal to the ratio of the resistance element 16 to that of the resistance element 15.

The servo system of the invention further comprises means for differentially adding the voltage difference between the junctions of the resistance elements 14, 17 and 15, 16 to the voltage of the input circuit to modify the response of the motor-energizing means. Specifically, there is provided a subtractor circuit 19, which may be a conventional circuit, included between the input circuit 11 and the power amplifier 18, to which is applied the servo control voltage from the input circuit 11 via terminals 19a and the differential voltage between the junctions of the two resistance arms described to input terminals 19b. Additionally, if it is desired to develop an output signal representative of the actual speed of the servo motor 10, there may be provided an output circuit 20 connected between the same junctions of the resistance elements of the two series circuits, as described.

To aid in the explanation of the operation of the servo system of the invention, there follows a mathematical analysis and, for convenience, the reference numeral of each of the resistance elements 14 to 17, inclusive, is accompanied by a symbol used in such analysis.

The voltage $V_A$ across the armature of a shunt direct-current motor can be expressed by the following equation:

$$V_A = I_A R_A + V_B \quad (1)$$

where $I_A$ = armature current
$R_A$ = total armature resistance
$V_B$ = armature back EMF voltage The armature back EMF is proportional to the speed of the motor and therefore:

$$V_B = KS \tag{2}$$

where
$K$ = proportionality constant
$S$ = motor speed

Combining equations 1 and 2 gives:

$$V_A = I_A R_A + KS \tag{3}$$

Equation 3 states that the armature voltage consists of two components, one component proportional to the current through the motor and the second component proportional to the speed of the motor. The voltage $V_A$ therefore cannot be used as a velocity feed-back signal but a voltage proportional to $V_B$ is usable.

In the circuit of the drawing, the voltage across $R_2$ is:

$$V_{R_2} = \frac{R_2}{R_1 + R_2} \cdot V_T \tag{4}$$

where $V_T$ is the output voltage of amplifier 18.

The voltage across $R_3$ is:

$$V_{R_3} = (V_T - V_B) \frac{R_3}{R_A + R_3} \tag{5}$$

$$= V_T \left(\frac{R_3}{R_A + R_3}\right) - V_B \left(\frac{R_3}{R_A + R_3}\right) \tag{6}$$

The feed-back signal $V_f$ is therefore:

$$V_f = V_{R_2} - V_{R_3} \tag{7}$$

$$= V_T \left[\frac{R_2}{R_1 + R_2} - \frac{R_3}{R_A + R_3}\right] + V_B \frac{R_3}{R_A + R_3} \tag{8}$$

If the ratio of $R_3:R_A$ is made equal to the ratio of $R_2:R_1$, then Equation 8 reduces to:

$$V_f = V_B \frac{R_3}{R_A + R_3} \tag{9}$$

The feed-back signal $V_f$ is therefore proportional to the back EMF of the motor $V_B$ and, thus, proportional to its speed.

Thus, the output of the subtractor 19 is the difference between the input signal applied to the circuit 11 and the feed-back signal $V_f$, and this difference or error signal is amplified in the unit 18 and applied to the motor 10. By providing sufficient amplification in the unit 18, such error signal may be made very small and will remain substantially constant over a wide range of input voltages applied to the input circuit 11, so that the speed of the motor 10 will, in fact, vary substantially linearly with such input voltage.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A direct-current motor servo system having a substantially linear voltage-speed characteristic comprising:
   a servo-signal input circuit;
   a first resistance element;
   a power amplifier responsive to the signal at said input circuit for energizing the armature of a motor to be controlled in series with said first resistance element;
   second and third serially connected resistance elements connected in parallel with the series connected armature and first resistance element and in the same order;
   the ratio of the resistance of said first element to the armature resistance of the motor to be controlled being substantially equal to the ratio of the resistance of said third element to that of said second element;
   and means for differentially adding the voltage difference between the junctions of the elements of said two series circuits to the voltage of said input circuit to modify the response of said motor-energizing means.

2. A direct-current motor servo system in accordance with claim 1 in which the differential adding means is included between said input circuit and said power amplifier.

3. A direct-current motor servo system in accordance with claim 1 including an output circuit connected between the junctions of the elements of said two series circuits to provide an output signal representative of the speed of the controlled motor.

References Cited

UNITED STATES PATENTS

| | | | |
|---|---|---|---|
| 2,799,819 | 7/1957 | Brown | 318—331 X |
| 3,229,182 | 1/1966 | Kubler | 318—331 |
| 3,268,790 | 8/1966 | Novak | 318—331 |

ORIS L. RADER, *Primary Examiner.*

B. A. COOPER, *Assistant Examiner.*